United States Patent
McIntyre

(10) Patent No.: US 7,533,129 B2
(45) Date of Patent: *May 12, 2009

(54) METHOD SOFTWARE PROGRAM FOR CREATING AN IMAGE PRODUCT HAVING PREDEFINED CRITERIA

(75) Inventor: Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 11/431,353

(22) Filed: May 10, 2006

(65) Prior Publication Data

US 2006/0206470 A1 Sep. 14, 2006

Related U.S. Application Data

(63) Continuation of application No. 10/242,861, filed on Sep. 13, 2002, now Pat. No. 7,092,966.

(51) Int. Cl.
*G06F 17/30* (2006.01)
(52) U.S. Cl. .................. 707/104.1; 707/5; 707/7; 345/619; 345/634
(58) Field of Classification Search .............. 707/100, 707/104.1, 1–7; 715/200, 733, 748, 749; 709/203; 345/619, 634
See application file for complete search history.

(56) References Cited

U.S. PATENT DOCUMENTS

| | | | |
|---|---|---|---|
| 5,791,692 A | 8/1998 | Manico et al. | |
| 5,940,121 A | 8/1999 | McIntyre et al. | |
| 5,957,502 A | 9/1999 | Manico et al. | |
| 5,999,912 A | 12/1999 | Wodarz et al. | |
| 6,004,061 A | 12/1999 | Manico et al. | |
| 6,223,190 B1 | 4/2001 | Aihara et al. | |
| 6,282,330 B1 * | 8/2001 | Yokota et al. | 382/309 |
| 6,408,301 B1 | 6/2002 | Patton et al. | |
| 6,590,586 B1 * | 7/2003 | Swenton-Wall et al. | 715/730 |
| 7,092,966 B2 * | 8/2006 | McIntyre | 707/104.1 |
| 2002/0019833 A1 | 2/2002 | Hanamoto | |

* cited by examiner

*Primary Examiner*—Cheryl Lewis
(74) *Attorney, Agent, or Firm*—Thomas J. Strouse; Raymond L. Owens

(57) ABSTRACT

A method and software program for creating an image product having at least one image provided thereon. The method includes providing a digital template for use in creating the image product. The digital template has at least one digital container for placement of digital content. The digital container has at least one designated image parameter. The method also includes searching a data base of digital content using at least one designated image parameter and providing at least one image content candidate for placement in at least one digital container.

16 Claims, 7 Drawing Sheets

# METHOD SOFTWARE PROGRAM FOR CREATING AN IMAGE PRODUCT HAVING PREDEFINED CRITERIA

CROSS REFERENCE TO RELATED APPLICATIONS

This is a continuation application of U.S. patent application Ser. No. 10/242,861 U.S. Pat. No. 7,092,966 filed Sep. 13, 2002 by Dale F. McIntyre, currently allowed.

FIELD OF THE INVENTION

The present invention relates to a method and software program for use in making digital image products.

BACKGROUND OF THE INVENTION

Digital image products that contain one or more images or that are made using digital images are well known. An example of one image product that can be made using digital images are album pages such as illustrated by U.S. Pat. Nos. 5,791,692; 5,957,502; and 6,004,061 to Manico et al. Similarly, methods of composing album page image products have been commercialized with software such as Kodak's Memory Album desktop software. In this application, users must tediously look through each folder on their computer to find the images that they wish to include in their image product. If the images are stored in multiple folders, the user must spend more time navigating to the folder and previewing the desired images. Additionally, the user must learn the specific nuances of the Kodak Memory Album software or equivalent to create and produce the page once the desired images have been located. Templates are a much easier, albeit less creative, approach to an imaging product, but image product templates don't suggest the type of images to use, nor do they automatically search for and rank potential image candidates.

In U.S. Pat. No. 6,223,190 to Aihara et al., a digital camera discloses receiving a script for capturing images and producing an HTML web page. The user is prompted to take a series of pictures that subsequently form a web page. However, the user can't specify an image to a particular location or choose from a plurality of ranked image candidates to place in a specific location. Also Aihara et al. doesn't automatically search for or suggest images to fill a predetermined location on a template that has predetermined locations and criteria, which create an image product such as an album page. Furthermore, Aihara et al. doesn't permit a user to automatically fill some, but not all, containers of an image product while producing a script for uploading to the camera to capture the partial list of desired images associated with the predetermined criteria.

SUMMARY OF THE INVENTION

In accordance with one aspect of the present invention there is provided a method for creating an image product having at least one image provided thereon, comprising the steps of:

providing a digital template for said image product, said template having at least one digital container for placement of digital image content, said digital container having at least one designated image parameter; and automatically searching a database of image content using at least one designated image parameter and providing at least one image content candidate for placement in said at least one location.

In accordance with another aspect of the present invention there is provided a method for creating an image product having at least one image, comprising the steps of:

selecting a template for said image product having at least one digital container for placement of an image, selecting an image parameter for said at least one digital container; and automatically searching a database of images for providing at least one image candidate in accordance with said selected image parameter that may be selected for placement in said digital container.

In accordance with yet another aspect of the present invention there is provided a method for creating an image product having at least one image provided thereon, comprising the steps of:

providing a digital template for said image product, said template having at least one container for placement of image content, said container having a plurality of designated image parameter which are provided in a rank; and automatically searching a database of image content using said plurality of designated parameters and providing a plurality of image content candidates for placement in said at least one container.

In accordance with still another aspect of the present invention there is provided a software program which when loaded on to a computer will cause said computer to perform the steps of:

providing a template for said image product, said template having at least one container for placement of image content, said container having at least one designated image parameter; and automatically searching a database of image content using at least one designated image parameter and providing at least one image content candidate for placement in said at least one location.

In accordance with still anther aspect of the present invention there is provided a software program which when loaded on to a computer will cause said computer to perform the steps of:

providing a template for said image product, said template having at least one container for placement of image content, said container having a plurality of designated image parameters which are provided in a rank; and automatically searching a database of image content using said plurality of designated image parameters and providing a plurality of image content candidates for placement in said at least one location.

In accordance with another aspect of the present invention there is provided a method for creating an image product using a digital image capture device, comprising the steps of:

providing a template for said image product on said digital image capture device, said template having at least one container for placement of an image content, said container having at least one designated image parameter;

capturing an image on said digital image capture device; and placing said captured image into one of said at least one container if said captured images corresponds to said designated image parameter.

In accordance with another aspect of the present invention there is provided a method for creating an image product using a digital image capture device, comprising the steps of:

providing a template for said image product on said digital image capture device, said template having at least one container for placement of an image content, said container having at least one designated image parameter;

reviewing said template to determine the designated image parameter of a container; and capturing an image that is appropriated for said location.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
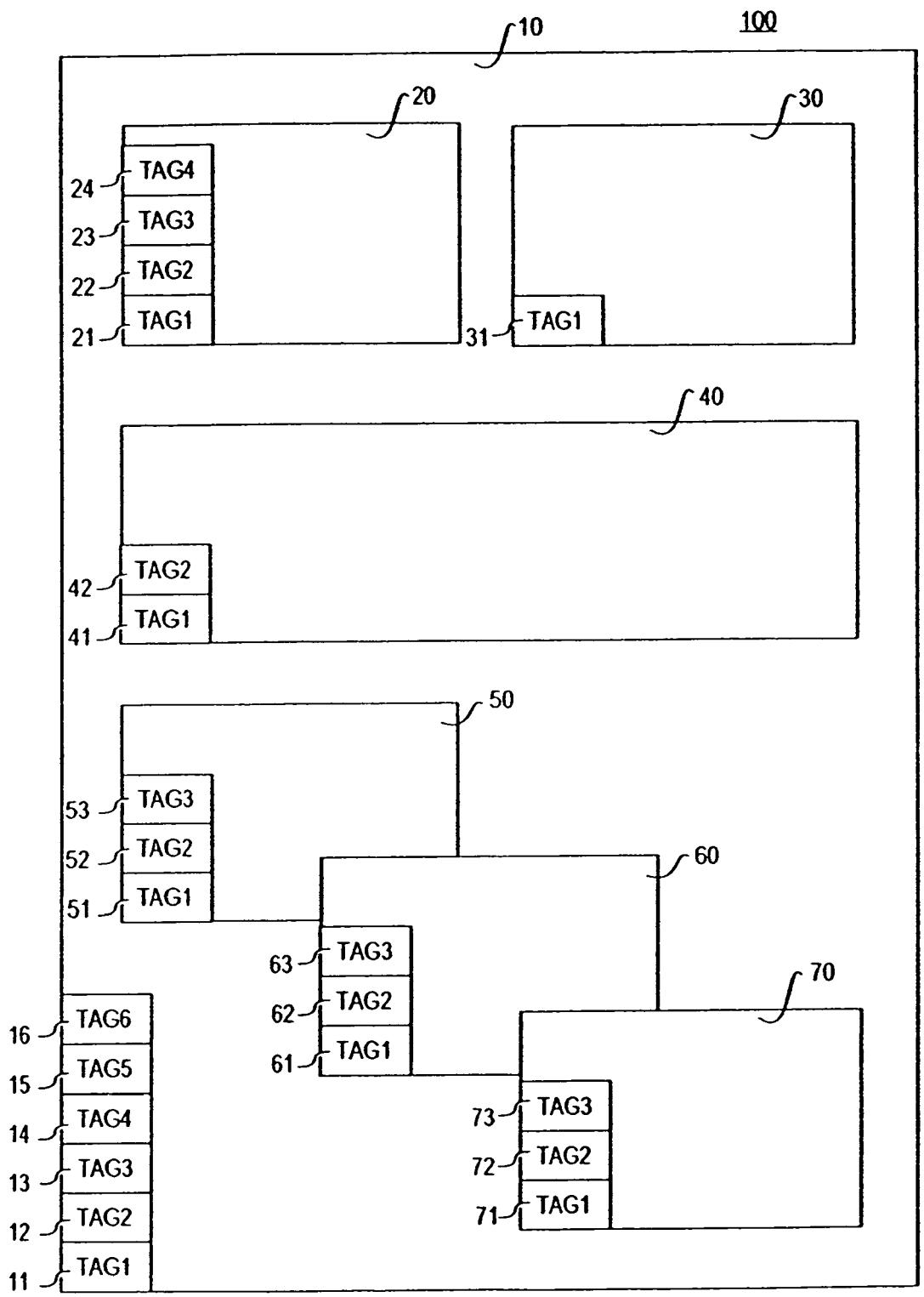
FIG. 1 is a plan view of an electronic template made in accordance with the present invention.

Turning to FIG. 1, an electronic template 100 is shown with seven containers 10, 20, 30, 40, 50, 60, 70 or locations for placement of digital images in a pre-configured arrangement that when populated by images form an image product. The image product may take a variety of forms, for example but not limited to, a hard copy display such as an album page, single or double sided, t-shirts, mugs, labels, print, etc. or as a soft display such as on a display device. The soft display may be stored on a database as a file, printed, and or transmitted over a communication for sharing with others. The electronic template 100 is displayed, for example, on a computer screen under control of a software application. The specific example of template 100 is a single page with seven containers as shown and neither the number of pages nor the number of containers on any individual page are limitations of the invention. The template 100 has a predetermined location for each of the containers. Each container 10, 20, 30, 40, 50, 60, and 70 of template 100 is further associated with at least one tag. Each tag identifies a designated image parameter or characteristic (commonly referred to as metadata) that describes an aspect of an image and/or content intended to be placed into the associated container according to the template 100. For clarity of discussion, the tags 11, 12, 13, 14, 15, 16, 21, 22, 23, 24, 31, 41, 42, 51, 52, 53, 61, 62, 63, 71, 72, and 73 are shown on FIG. 1 associated with specific containers and should be interpreted as follows: TAG X; where X=tag rank (1=highest rank). For example, container 40 has the dimensions of a panoramic style image and is associated with tags 41, and 42, where tag 41 has been predetermined to be "LAKE" and tag 42 has been predetermined to be "BOAT". Therefore, the template 100 has been designed to preferably include a panoramic image of a lake placed at the location of container 40, and that the image to be placed there preferably also includes a boat. Each container 10, 20, 30, 40, 50, 60, and 70 of template 100 is shown to have at least one tag, but may have as many tags as designated by the designer of the template. Therefore, different containers may have different numbers of tags associated with them. It should be noted that the designer of the template may permit the user to modify the predetermined tags in a common fashion with a tool such as a text editor.

Figure 2:
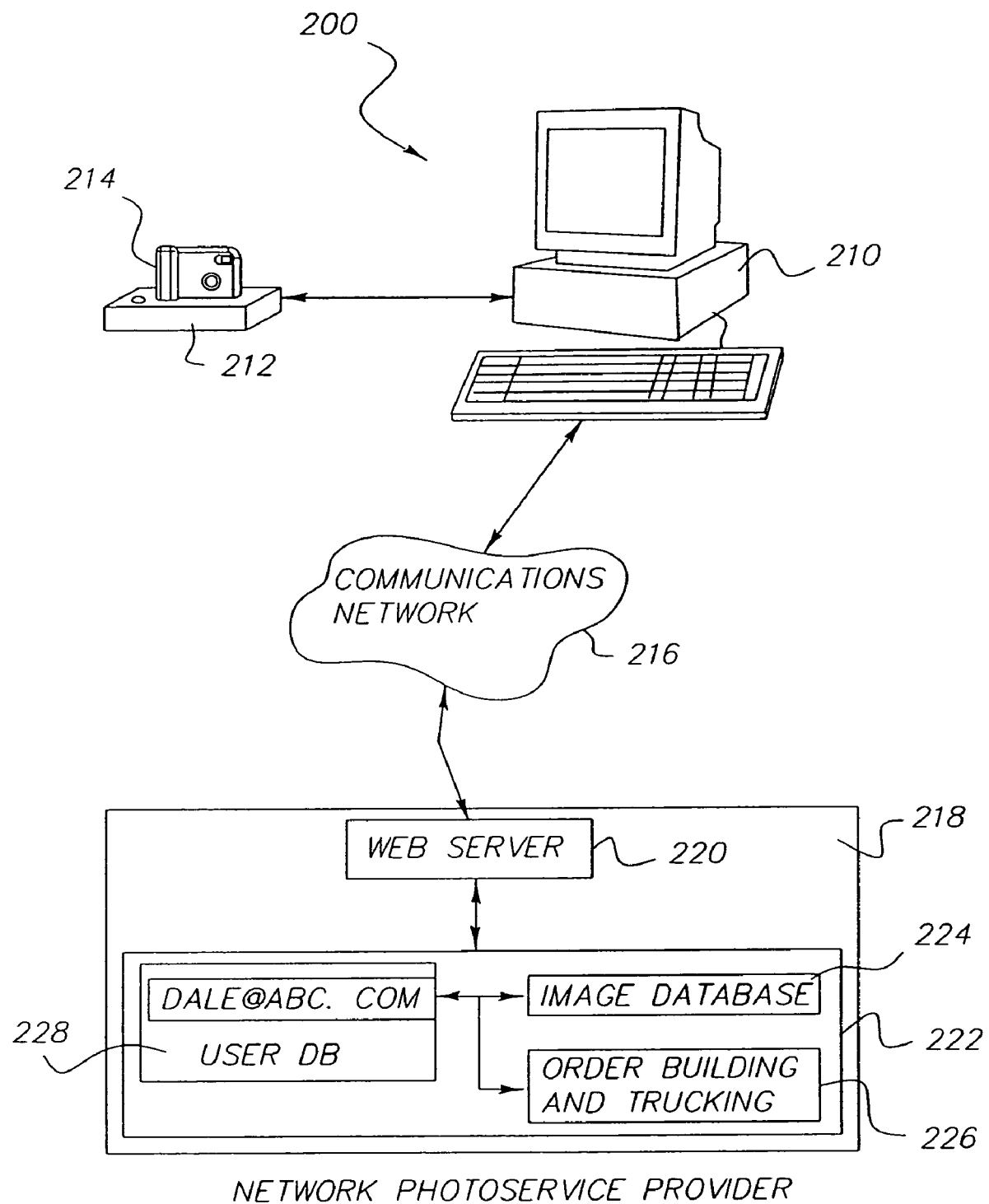
FIG. 2 is a plan view of a system for practicing a method according the present invention.

Turning now to FIG. 2, a system 200 is shown that includes a computer 210 such as a personal computer or other computer capable device such as a Kodak Picture Maker™ kiosk, an electronic/digital camera 214 with docking station 212 for transferring image content to computer 210, communications network 216 such as the Internet and a network photoservice provider 218. In the embodiment illustrated a docking station is used for communication between the digital camera and computer, however it is to be understood the digital camera can communicate directly with a computer. Network photoservice provider 218 further includes a server 220 for handling communications with the communications network 216, a computer 222 including a user database 228, an image database 224 for storing images associated with users in user database 228, and an order building and tracking function 226 for facilitating the fulfillment of orders placed by users. An example of such a network photoservice provider is Ofoto Inc.

In the system 200, electronic/digital camera 214 can be, for example, the DX3600 Easy Share Camera manufactured by Eastman Kodak Company, which can record both digital still images and motion image sequences. Docking station 212 can be the Easy Share Camera Dock also manufactured by the Eastman Kodak Company, which communicates with computer 210 via the commonly known Universal Serial Bus (USB). It should be noted that template 100 discussed above has containers 10, 20, 30, 40, 50, 60, and 70 for controlling the placement of image content according to the tags associated with each container. If the image product represented by template 100 is intended for soft display, then the image content for any container 10, 20, 30, 40, 50, 60, or 70 may comprise a motion image sequence. Likewise, if the image product represented by template 100 is intended for hard copy output, then the image content for any container 10, 20, 30, 40, 50, 60, or 70 may be a digital still image or a specific frame or integration of frames (which form a single digital still image) from a motion image sequence. In the system 200, image content may be stored in a database within computer 210, in the image database 224 of computer 222 within network photoservice provider 218, or any other third party database that is accessible over a communication network. Such image content databases typically include metadata associated with each image stored in the database. The metadata, can be stored with the image or in a separate database construct and is not limiting the present invention. The metadata includes information that can be associated with criteria/parameter identified by the tags. Some metadata such as time and date are provided by electronic/digital camera 214 and some metadata is added by the user with software such as After Shot by Jasc Inc. This may be done manually by the user or automatically by the digital camera. The image content and metadata may be stored anywhere accessible via communications network 216 and may belong to a third party wherein use of particular image content may incur a fee. While image content has been shown in the above example to originate from an electronic camera, the invention is not so limited. Film or other hard copy images may be converted to digital still images as is well known and loaded into image databases in computers via compact disks such as the PictureCD™ from Kodak and uploaded to network photoservice providers like Ofoto Inc.

Figure 3:
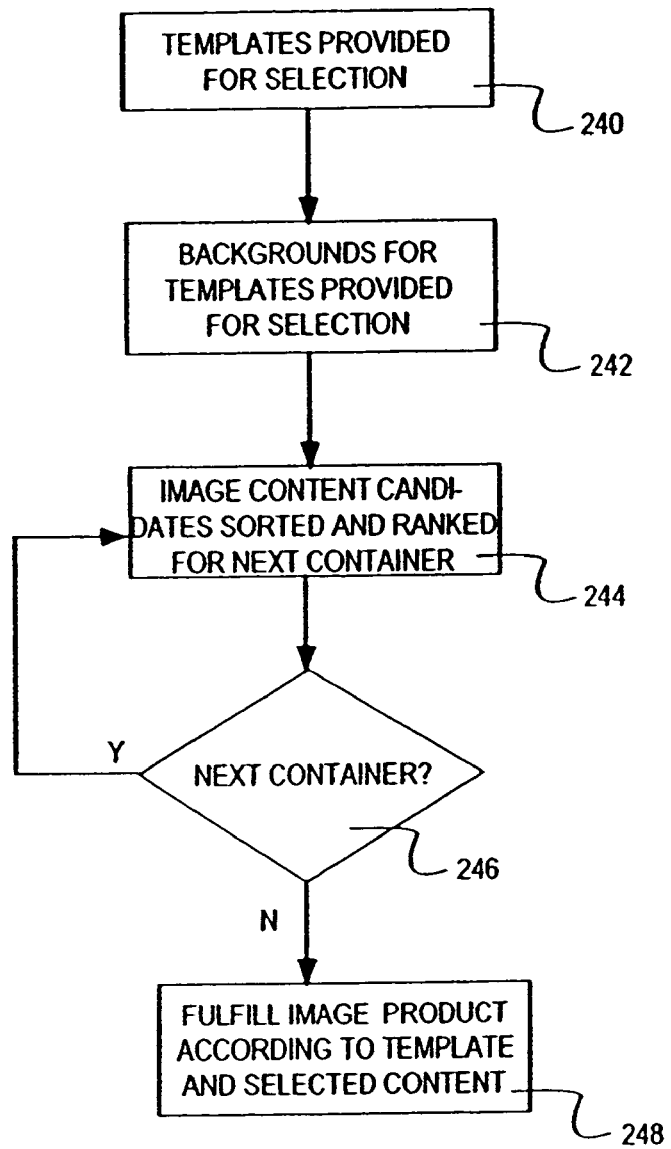
FIG. 3 is a flow chart of one method for creating an image product in accordance with the present invention.

In FIG. 3, a flowchart depicts the steps in the method of the present invention. Beginning at step 240, the user of computer 210 is provided with a plurality of templates via representations of image products by software running on computer 210 or other computer system accessed by computer 210. These representations of image products have templates associated with them that permit the customization of the image product to the specific user operating the computer 210. In the example shown in FIG. 1 with template 100, container 10 circumscribes the entire page and represents a background image with tags 11, 12, 13, 14, 15, and 16. In step 242, the user is provided with a selection of candidate background images retrieved from image content database 222 (or the image content database internal to computer 210) that meet the designated image parameters/characteristics of tags 11, 12, 13, 14, 15, and 16 associated with container 10. Meeting the designated image parameters typically is performed by using the tags to automatically search the metadata associated with images stored in the image database being searched. Preferably, these candidate background images are presented to the user in a ranked order sequence, which will be discussed further with respect to FIG. 4 and FIG. 5. After background image content has been selected by the user, at steps 244 and 246 repeat the process of searching relevant image content databases (metadata stored in association with image content) for candidate image content (selected by container tags) for each successive container of template 100 and presenting the appropriate content to the user for final selection. In step 248, the user confirms the correct selection of all container content and permits the completion of the image product. The image product can be fulfilled by the network photoservice provider 218 and delivered to the user in any conventional manner. If the user was operating the computer 210 as a Kodak Picture Maker™ kiosk (not shown), the fulfillment typically is performed within the kiosk and the image product delivered to the user within a short period of elapsed time.

Figure 4:
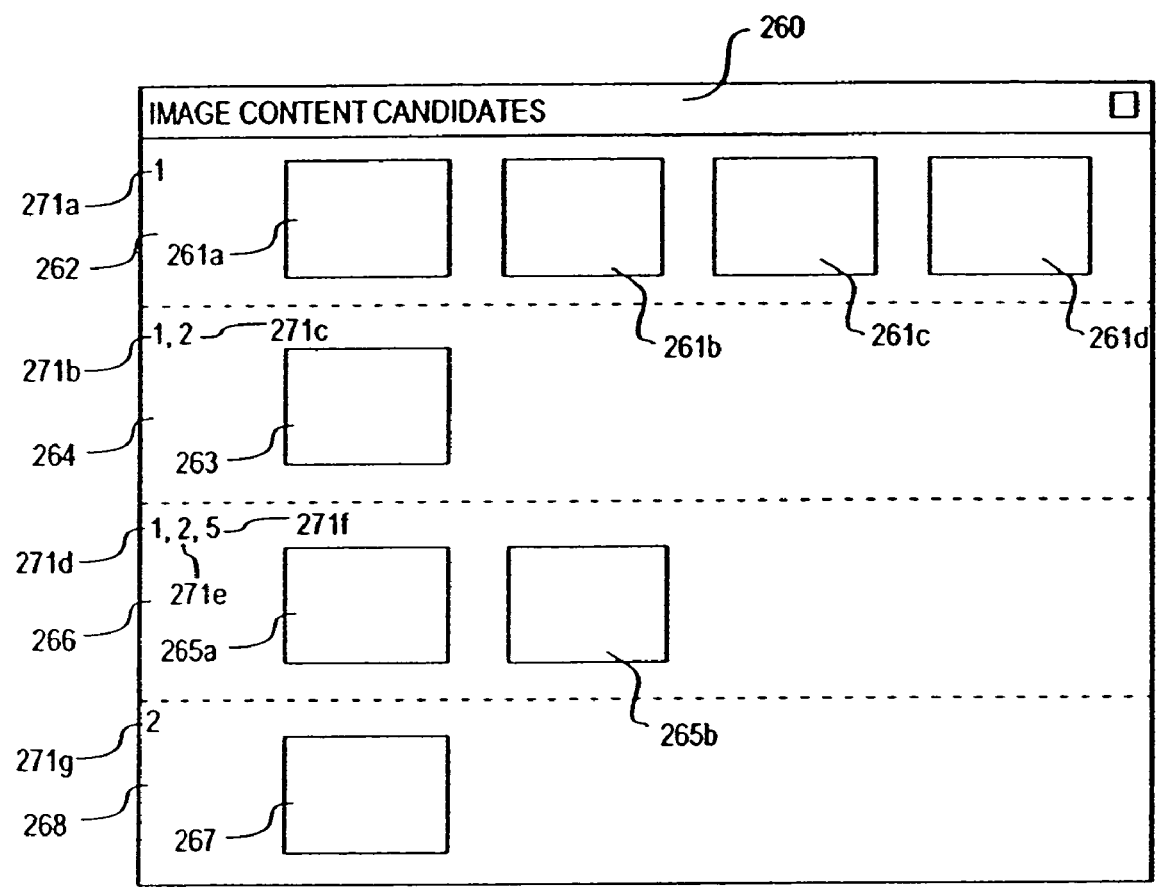
FIG. 4 is a first display window of a display device illustrating an electronic template in accordance with the present invention for use in making an image product.

Turning now to FIG. 4, there is illustrated a separate display window 260 from the template 100 and has been provided to the user for selection of image content candidates that have been identified and ranked according to a predetermined order system. In this embodiment, the image content candidates 261a, 261b, 261c, 261d, 263, 265a, 265b, 267 have been arranged into groups 262, 264, 266, and 268 according to the matching of metadata the ranked tags associated with the associated container. The image content candidates 261a, 261b, 261c, and 261d in group 262, for example, match the highest ranking tag only as shown by rank indicator 271a. Likewise, image content candidate 263 in group 264 matches tags ranked first and second as shown by rank indicators 271b and 271c. Image content candidates 265a and 265b in group 266 match tags ranked first, second and fifth as shown by rank indicators 271d, 271e, 271f, and image content candidate 267 in group 268 matches the tag ranked second only (no other matching tags) as indicated by rank indicator 271g.

So far, image content candidates have been identified by matching tags with metadata that has been associated with a database of image content. There are, however, other criteria implicit in the physical layout of the template 100 and its containers 10, 20, 30, 40, 50, 60, and 70. Layout criteria such as the dimensions of the containers 10, 20, 30, 40, 50, 60, and 70 can help the software rank or sort the candidate images appropriately. For example, container 40 is shown as a panoramic image format. Candidate image content that matches the tags 41 and 42 can be ranked by the tags and further ranked by the dimensions of the image file. Preferably, candidate images that have a panoramic format would rank higher than candidate images with a general "landscape" image format, which would rank higher than candidate images with a "portrait" image format. A tag is an example of explicit criteria, container shape is an example of implicit criteria.

Figure 5:
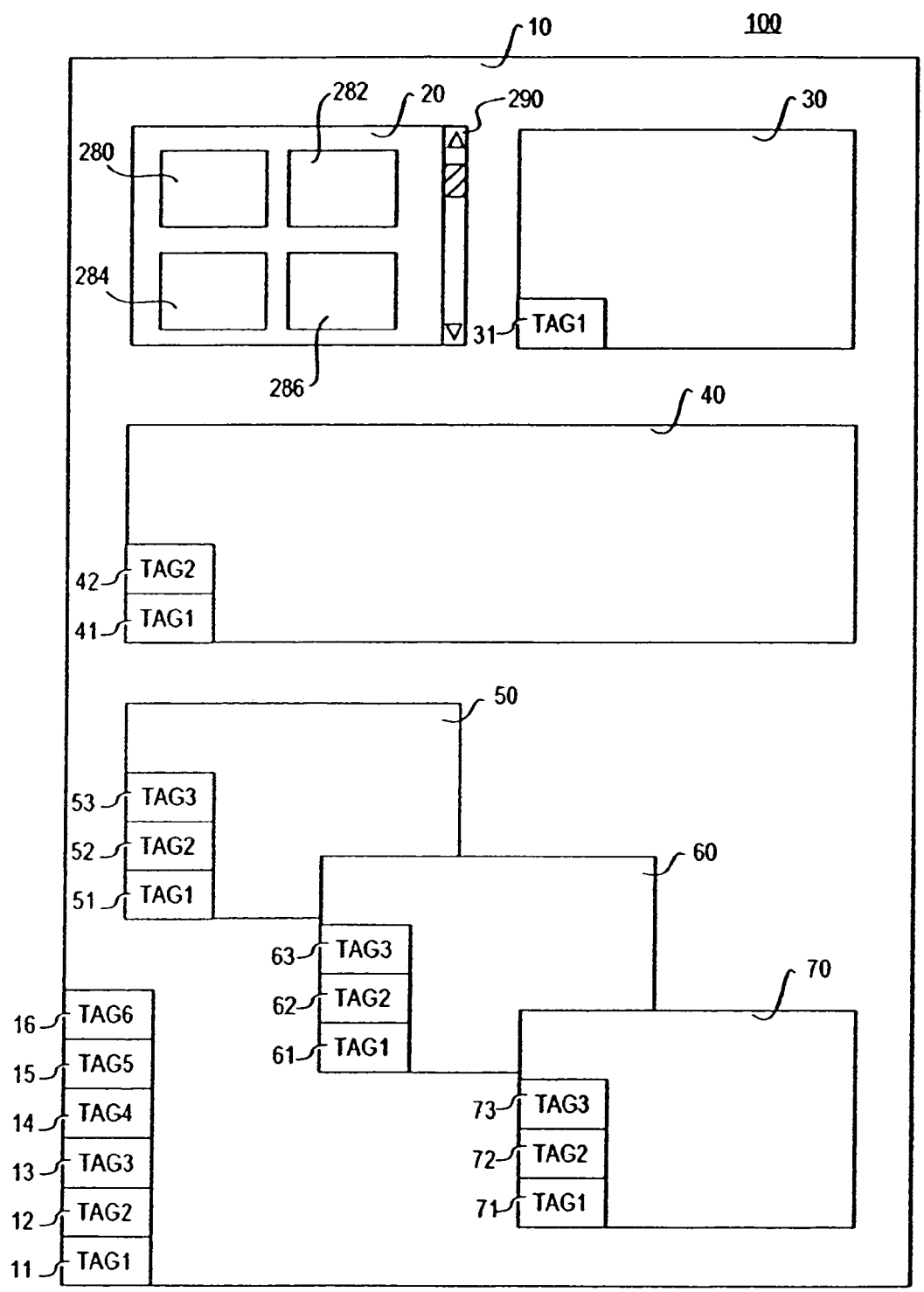
FIG. 5 is another display window of a display device illustrating an electronic template made in accordance with the present invention.

In FIG. 5, template 100 is shown on, for example, the display device of computer 210 (as shown in FIG. 2) wherein each container can be used to display a plurality of image content candidates in a thumbnail format. In the particular example illustrated, container 20 is shown with a plurality of image content candidates 280, 282, 284, and 286. Additional image content candidates can be displayed by actuating the scroll bar 290, which is only active if additional image content candidates have been identified, but not displayed. Optionally, a rank indicator may be associated with each thumbnail image so that the user readily determined which of the tags were related to the image.

If template 100 has been selected by the user prior to acquiring the images necessary to complete the template and thus the image product, the computer 210 can convert the template 100 into a script or menu that can be downloaded to the electronic/digital camera 214 via docking station 212 or otherwise. The selected image product as identified by the template 100 can be partially completed by the method previously described wherein an image database is searched for images matching the tags associated with a given container. For those containers where no images were located, a partial script or menu can be associated with the template 100 and downloaded to the electronic/digital camera 214. Cameras that can accept scripts are well known and include the Kodak DC265 electronic camera.

Figure 6:
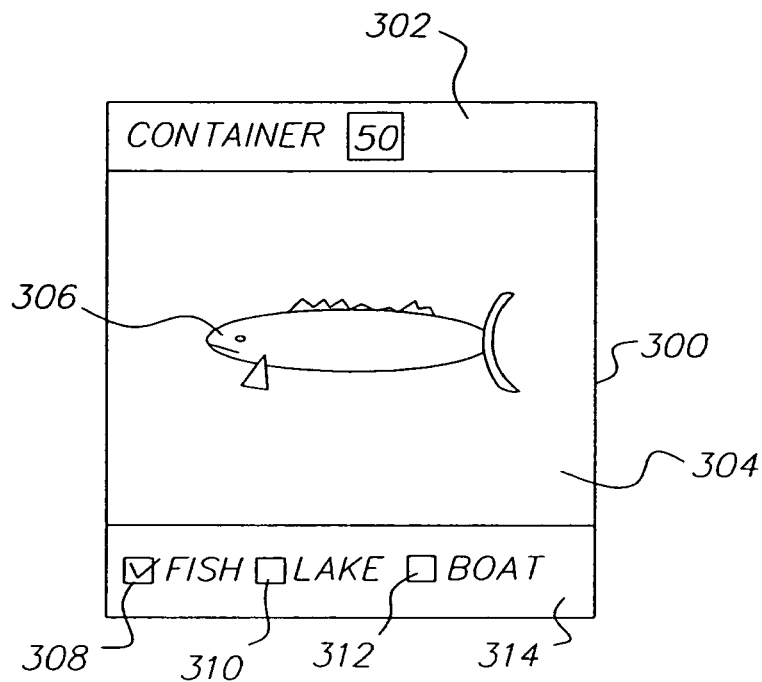
FIG. 6 illustrates a display device in an image capture device being run by a software program made in accordance with the present invention.

Turning now to FIG. 6, a display 300 is shown which is included in the electronic/digital camera 214 as is typical in the art. Template 100 has been converted to a new display format and transferred to the camera 214. Display 300 shows a field 302 for identifying a container in which the image content 306 displayed in section 304 is to be identified for placement. In the embodiment illustrated it can be seen that the image content 306 is to be placed in container 50 of template 100. Metadata selection boxes 308, 310, and 312 are displayed in metadata field 314 wherein selections made by the user are appended as metadata to the image content 306. As can be seen by reference to FIG. 1, container 50 has three tags 51, 52, and 53 each representing a different characteristic. In the example of FIG. 6, tag 51 is the highest-ranking tag and has been predetermined via design of template 100 to be directed to "FISH". Using commonly found camera selection controls (not shown), the user may choose to select the appropriate sections boxes for field 314. For example in addition to selecting section box 308, selection box 310 which describes the characteristic of ("LAKE") associated with tag 52 (as shown in FIG. 1) and selection box 312 which describes the characteristic of ("BOAT") associated with tag 53 (as shown in FIG. 1). If the user doesn't select the additional tags, then the image content 306 is stored in the camera's memory with the metadata including "container 50" and "FISH" in addition to any conventionally stored metadata such as the time and date. Upon transferring image content 306 to computer 210 and activating template 100, the newly captured image content 306 is automatically placed into the appropriate container as selected by the user. It should be noted that a user, selecting template 100 may only need one image to complete the template 100. Therefore, only the container and tags corresponding to the needed image is converted and downloaded to the electronic/digital camera 214.

Figure 7:
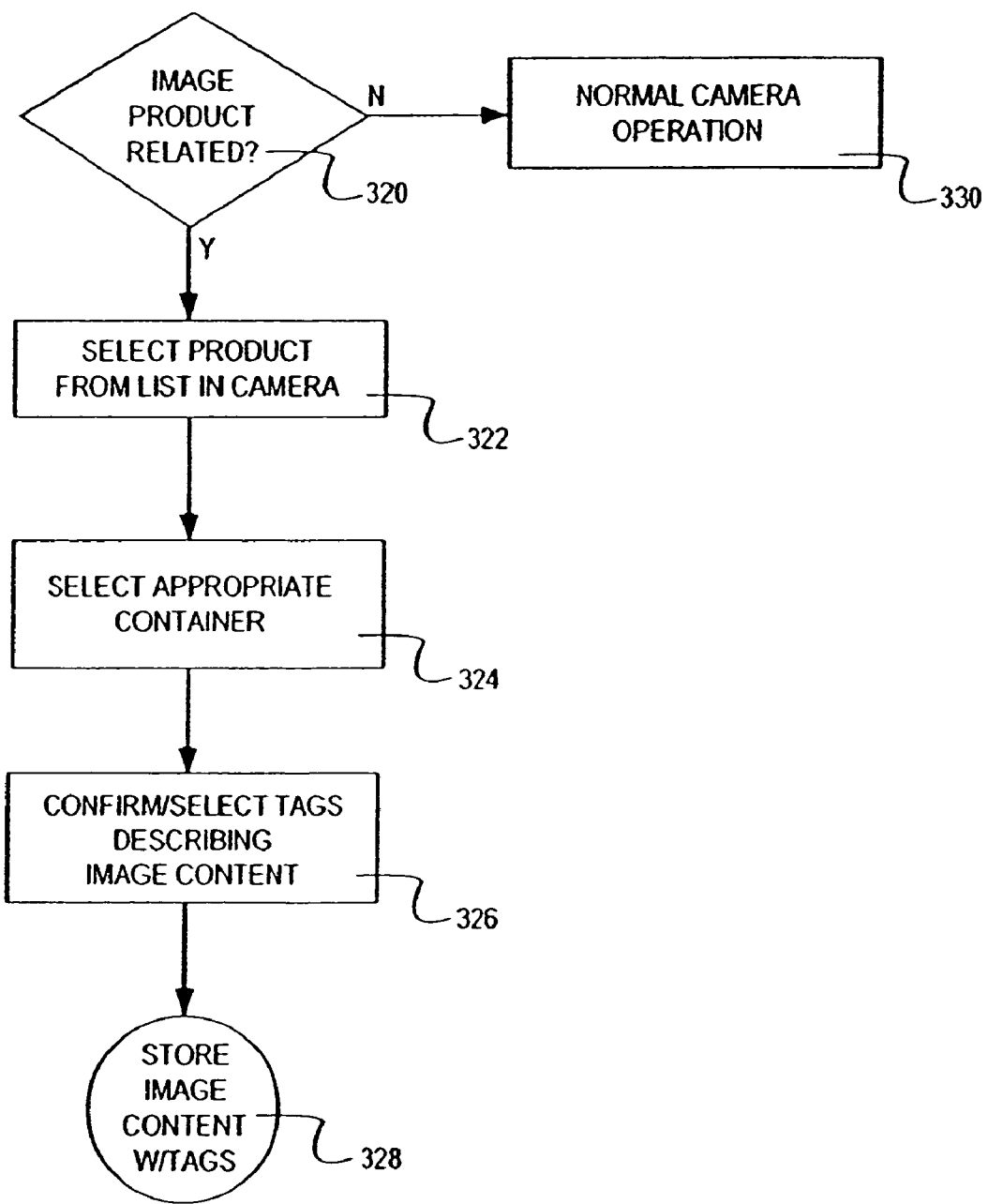
FIG. 7 is a flow chart of a software program made in accordance with the present invention for use with a digital capture device.

In the operation of camera 214, a user is prompted to first decide, then identify captured image content 306 with a particular template (and thus image product) in steps 320 and 322 of FIG. 7. If the captured image content 306 is not associated with an image product then the camera assumes its normal camera operating mode in step 330. It should be noted that the electronic camera can store scripts for more than one image product at a time limited only by the memory capacity of the camera. Once the template has been identified, the user must select the container (step 324) displayed in field 302 that the image content 306 is associated. Selecting the container 50 in step 324 causes field 314 to display the selection boxes 308, 310, and 312 for that container. Upon confirming (step 326) the default selection of tag 51 and/or selecting additional tags 52 and/or 53, the image content 306 is stored with the appropriate metadata as discussed above in step 328. The foregoing procedure may be done for each image as captured or by scrolling through the containers and images after a number of images have been captured.

Figure 8:
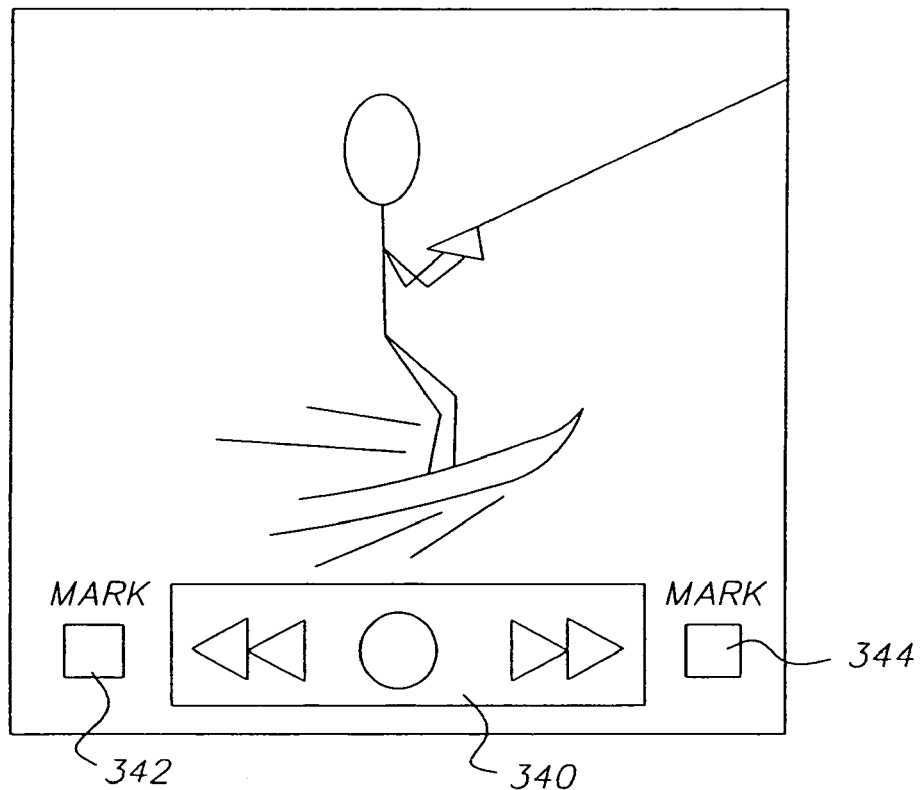
FIG. 8 illustrates a display window of a display device showing an image being presented in accordance with the present invention.

Turning to FIG. 8, the display of computer 210 (as shown in FIG. 2) shows an image for placement in container 30 of template 100 that comprises an image motion sequence. In the embodiment illustrated, template 100, produces a hard-copy output product requiring still images. Software on computer 210 causes the display of user controls 340 to assist the user in the creation of digital still image from an image motion sequence. User controls 340 are used to advance the motion sequence in either direction to the desired frame. If a single frame is desired, the user need only select box 342. If the user wishes to create a digital still image from several frames (useful for low light conditions to improve sharpness and remove grain), the first frame is marked using box 342 as described above. The user advances the motion sequence frame by frame to the last frame to include in the processing (known in the art as frame averaging) and selects box 344. Using conventional frame averaging algorithms, computer 210 processes the selected frames into a single digital still image for placement in container 30 and thus, the resultant image product.

It is to be understood that when the template including the selected image or images that is associated with each container in the template may comprise a single digital file (folder) that can be transmitted as a whole. For example, but not limited to, the single digital file may transmitted over a communication network for sharing and/or fulfillment, or sent to a local or remote printer for producing an image product. Such images may comprise, for example, a hard copy print or other image product that have the selected images in accordance with the associated template.

The invention has been described in detail with particular reference to certain preferred embodiments thereof, but it will be understood that variations and modifications can be effected within the scope of the invention.

PARTS LIST

10. Container
11. Tag
12. Tag
13. Tag
14. Tag
15. Tag
16. Tag
20. Container
21. Tag
22. Tag
23. Tag
24. Tag
30. Container
31. Tag
40. Container
41. Tag
42. Tag
50. Container
51. Tag
52. Tag
53. Tag
60. Container
61. Tag
62. Tag
63. Tag
70. Container
71. Tag
72. Tag
73. Tag
100. Template
200. System
210. Computer
212. Docking station
214. Electronic/Digital camera
215. Communications Network
218. Network photoservice provider
220. Web server
222. Computer
224. Image database
226. Order building and tracking function
228. User database
240. Step
242. Step
244. Step
246. Step
248. Step
260. Display window
261a. Image content candidates
261b. Image content candidates
261c. Image content candidates
261d. Image content candidates
262. Groups
263. Image content candidates
264. Groups
265a. Image content candidates
265b. Image content candidates
266. Groups
267. Image content candidates
268. Groups
271a. Rank indicator
271b. Rank indicator
271c. Rank indicator
271d. Rank indicator
271e. Rank indicator
271f. Rank indicator
271g. Rank indicator
280. Image content candidates
282. Image content candidates
284. Image content candidates
286. Image content candidates
290. Scroll bar
300. Display
302. Field
304. Section
306. Image content 308. Metadata selection boxes
310. Metadata selection boxes
312. Metadata selection boxes
314. Metadata field
320. Step
322. Step
324. Step
326. Step
328. Step
330. Step
340. User controls
342. Select box
344. Select box

What is claimed is:

1. A method for capturing content to create an image product, comprising:
 providing at least one template for an image product on a digital image capture device, the template having at least one container for placement of content;
 prompting a user to capture content for placement in the container; and
 capturing the content further including providing at least one script on the digital image capture device for prompting providing at least one script on the digital image capture device for prompting the user to populate the at least one container of the at least one template.

2. An image capture device for capturing content to create an image product, comprising:
 a memory for storing at least one template that defines an image product, the template having at least one container for placement of content;
 a display for prompting a user to capture content for placement in the container; and
 a means for capturing the contentj; and
 wherein the display provides controls for allowing the user to select an appropriate tag for the captured content and for allowing metadata representing the tag to be appended to the captured content.

3. The device of claim 2, wherein the content is at least one digital still image.

4. The device of claim 2, wherein the content is an image motion sequence.

5. The device of claim 2, further comprising: a medium for transferring the captured content to a computer;
 a processor for sorting and ranking the captured content for the at least one container;
 a display for selecting a candidate from the captured content and for associating the selected candidate to the at least one container; and
 a program storage device readable by a computer, tangibly embodying a program of instructions executable by the computer for placing an order for an image product based on the template.

6. The device of claim 2 further comprising a program for selecting a plurality of frames from an image motion sequence to create a candidate by processing the plurality of frames.

7. The device of claim 2 further comprising a docking station for transferring the captured content to a computer.

8. The device of claim 2 farther comprising programming for assembling the template with captured content into an image product for ordering.

9. A method for capturing content to create an image product, comprising:
 providing at least one template for an image product on a digital image capture device, the template having at least one container for placement of content;
 prompting a user to capture content for placement in the container; capturing the content and selecting an appropriate tag for the captured content and appending metadata representing the tag to the captured content.

10. A method for capturing content to create an image product, comprising:
 providing at least one template for an image product on a digital image capture device, the template having at least one container for placement of content;
 prompting a user to capture content for placement in the container; and
 capturing the content and including capturing at least one digital still image.

11. A method for capturing content to create an image product, comprising:
 providing at least one template for an image product on a digital image capture device, the template having at least one container for placement of content;
 prompting a user to capture content for placement in the container; and
 capturing the content including capturing an image motion sequence.

12. The method of claim 11 further comprising providing a docking station for transferring the captured content to a computer.

13. The method of claim 12, wherein providing at least one template for the image product on the digital image capture device further comprises providing the at least one template by the docking station.

14. The method of claim 12 further comprising automatically assembling the template with captured content into an image product for ordering goods and services.

15. A method for capturing content to create an image product, comprising:
 providing at least one template for an image product on a digital image capture device, the template having at least one container for placement of content;
 prompting a user to capture content for placement in the container;
 capturing the content;
 transferring the captured content to a computer;
 sorting and ranking the captured content for the at least one container;
 selecting a candidate from the captured content;
 placing the selected candidate in the at least one container; and
 placing an order for an image product based on the template.

16. The method of claim 15, wherein selecting a candidate from the captured content further comprises selecting a plurality of frames from an image motion sequence and creating a candidate by processing the plurality of frames.

* * * * *

UNITED STATES PATENT AND TRADEMARK OFFICE
CERTIFICATE OF CORRECTION

PATENT NO. : 7,533,129 B2  Page 1 of 1
APPLICATION NO. : 11/431353
DATED : May 12, 2009
INVENTOR(S) : Dale F. McIntyre It is certified that error appears in the above-identified patent and that said Letters Patent is hereby corrected as shown below:

Column 9, line 36    delete "contentj;" and insert --content;--

Column 10, line 1    delete "farther" and insert --further--

Signed and Sealed this

First Day of September, 2009

David J. Kappos
*Director of the United States Patent and Trademark Office*